(12) United States Patent
Eisenbacher et al.

(10) Patent No.: US 6,387,000 B1
(45) Date of Patent: May 14, 2002

(54) PRESSURE MEDIUM SUPPLY ARRANGEMENT FOR A CONTINUOUS VARIABLE TRANSMISSION

(75) Inventors: Egon Eisenbacher, Karlstadt; Manfred Unsöld, Rechtenbach, both of (DE)

(73) Assignee: Hydraulik-Ring GmbH, Limbach-Oberfrohna (DE)

( * ) Notice: Subject to any disclaimer, the term of this patent is extended or adjusted under 35 U.S.C. 154(b) by 0 days.

(21) Appl. No.: 09/558,255

(22) Filed: Apr. 25, 2000

(30) Foreign Application Priority Data

Apr. 30, 1999 (DE) ......................... 199 19 815
May 31, 1999 (DE) ......................... 199 24 855

(51) Int. Cl.⁷ .......................... F16H 59/00; F16H 61/00; F16H 63/00
(52) U.S. Cl. .......................................... 474/18; 474/28
(58) Field of Search ............................. 474/18, 28, 69, 474/70; 137/505, 455, 118.01, 118.02; 417/510, 287, 319, 440, 300, 310, 295; 60/486, 459, 422; 91/516; 477/45–48

(56) References Cited

U.S. PATENT DOCUMENTS

| 4,014,630 | A | | 3/1977 | Drutchen |
| 4,702,725 | A | * | 10/1987 | Kuono et al. ................. 474/28 |
| 4,746,276 | A | * | 5/1988 | McBurnett et al. ......... 417/295 |
| 5,137,498 | A | * | 8/1992 | Gunsing ....................... 474/28 |
| 5,217,412 | A | * | 6/1993 | Indlekofer et al. ............ 474/69 |
| 5,232,406 | A | * | 8/1993 | Sato ............................. 474/28 |
| 5,263,387 | A | * | 11/1993 | Reiners .................... 474/28 X |
| 5,720,691 | A | * | 2/1998 | Ogawa et al. ............ 474/28 X |
| 5,752,810 | A | * | 5/1998 | Hein ............................ 417/319 |
| 6,223,763 | B1 | * | 5/2000 | Meyer et al. .............. 60/422 X |
| 6,280,159 | B1 | | 8/2001 | Agner et al. |

FOREIGN PATENT DOCUMENTS

| DE | 37 27 633 | | 3/1989 |
| DE | 4120972 | * | 1/1993 |
| EP | 0 076 552 | | 4/1983 |
| EP | 0 272 109 | | 6/1988 |
| EP | 0 445 529 | | 9/1991 |
| EP | 0 502 263 | | 9/1992 |
| EP | 0 881 414 | | 12/1998 |

* cited by examiner

Primary Examiner—Thomas R. Hannon
Assistant Examiner—Marcus Charles
(74) Attorney, Agent, or Firm—Gudrun E. Huckett

(57) ABSTRACT

A pressure medium supply arrangement for a CVT transmission has a pump that supplies pressure medium to control cylinders of the CVT transmission in order to change a gear ratio of the CVT transmission. The pump has a high pressure side and a low pressure side. The pump further has a bypass channel connecting the high pressure side and the low pressure side. An electrically controlled control valve arrangement is connected to the pump for opening and closing the bypass channel in order to adjust a conveyed flow of the pump.

9 Claims, 6 Drawing Sheets

PRESSURE MEDIUM SUPPLY ARRANGEMENT FOR A CONTINUOUS VARIABLE TRANSMISSION

BACKGROUND OF THE INVENTION

1. Field of the Invention

The invention relates to a pressure medium supply arrangement for a continuous variable transmission (CVT transmission) comprising a pump by which the control cylinder can be supplied with pressure medium (hydraulic medium) for changing the gear ratio, wherein the pump has correlated therewith a control valve arrangement via which a bypass channel between the high-pressure side and the low-pressure side of the pump can be opened or closed for controlling the conveyed flow.

2. Description of the Related Art

Such CVT transmissions have been known for several years and allow a continuous change of the gear ratio of a motor vehicle. Since the CVT transmissions have not been able to compete with conventional automatic transmissions, efforts are currently undertaken in the process of developing high torque diesel engines (common rail fuel injection system, monobloc injection pump and nozzle injection systems) to use the advantages of the CVT transmission, i.e., the possibility of a continuous change of the gear ratio as a function of the operational parameters of the motor. Such transmissions allow, for example, to maintain the engine within predetermined torque or output ranges as a function of the driving conditions (acceleration, steady driving, breaking etc.) so that an optimal output with optimal fuel consumption is ensured.

FIG. 1 shows a basic concept of a CVT transmission as, for example, disclosed in the European patent document 0 271 109 or European patent document 0 076 552.

The central part of the CVT transmission 1 illustrated schematically in FIG. 1 is a belt or piston drive 2 by which the crankshaft of an internal combustion engine 4 is connected with the reducing gear transmission 6 of a motor vehicle. The ratio of speeds of the belt drive can be adjusted continuously, for example, in the range of 3:1 up to 0.3:1 so that the motor 4 as a function of the desired driving state can always be maintained within the optimum torque/output range.

The belt drive has a belt 10 which is guided on two V pulleys 12, 14. The upper V pulley 12 of FIG. 1 is coupled to the motor 4 while the lower V pulley 14 is connected to the reducing gear transmission 6. The belt 10 is comprised conventionally of circulating steel belts which have a plurality of plate-shaped elements 16 by which the belt 10 rests on the V pulleys 12 or 14.

Each of the V pulleys 12, 14 has a stationary disc 18 or 19 and a movable disc 20 or 21 which can be moved in the axial direction relative to the correlated stationary disc 18 or 19 in order to change the support width for the belt 10 or, in other words, for the elements 16. The movement of the movable discs 20, 21 is performed by control cylinders 22, 24 wherein, for example, the control cylinder 22 correlated with the V pulley on the motor side has a greater end face surface then the cylinder 24 on the reducing gear transmission side. The control cylinders 22, 24 are connected by a control device 26 and a control valve arrangement 28 to a pump 30 and a hydraulic medium tank T.

As can be taken from the schematic of FIG. 1, the two movable discs 20, 21, respectively, the stationary discs 18, 19 are arranged in a crossed arrangement so that the belt 10 is guided always straight, i.e., in a perpendicular line to the axes of the V pulleys 12, 14.

The control device 26 comprises, for example, a two-edge or four-edge control slide (piston) by which the hydraulic medium supplied by the pump 30 can be distributed to the two control cylinders 22, 24 in order to perform the desired adjusting movements. When, for example, the same pressure is present, the support width of the V pulley 12 at the motor side is reduced by the greater force of the control cylinder 22 and, accordingly, the support width of the V pulley 14 at the reducing gear transmission side is enlarged against the force transmitted by the control cylinder 24 so that the belt 10 in the representation according to FIG. 1 moves upwardly. This is so because of the different size of the end faces of the control cylinders 22 and 24.

Via the control valve arrangement 28 the conveyed flow of the pump 30 is adjusted so that at all times only the required amount of hydraulic medium flows to the control cylinders 22, 24 or is returned from them into the tank T.

The pumps 30 are often in the form of rotary piston pumps, for example, internal gear pumps, because they have a comparatively simple construction and can produce relatively high pressures with minimal weight. A further advantage of internal gear pumps is that they can be used in comparatively broad rpm (revolutions per minute), temperature, and viscosity ranges and operate with minimal pulsation and noise.

In European patent document 0 445 529 B1 an internal gear pump is described in which two gear wheels are rotatably supported in the housing. The displacement chambers are delimited by meshing tooth flanks, an inner wall of the housing, and an axial plate or pressure plate. The latter is loaded on its backside by a hydraulic medium so that it contacts sealingly the end faces of the gear wheels. The pressure acting on the backside of the pressure plate can be adjusted by a control device in which a metering orifice embodied as a directional control valve and a three-port directional pressure regulator (pressure scale) cooperate. It is loaded in the sense of increasing the pressure at the backside by the pressure downstream of the metering orifice as well as a pressure spring and in the sense of a reduction of the pressure at the backside by the pressure upstream of the metering orifice. The pressure regulator (pressure scale) connects forth is purpose a control connector connected to a pressure chamber on the backside of the pressure plate with the pressure outlet of the pump or with the tank, so that the sealing gap between the pressure plate and the end faces of the gear wheels is reduced or enlarged. For an enlarged sealing gap the hydraulic medium can flow directly from the high pressure side to the low pressure side so that the volumetric efficiency of the gear wheel machine can be reduced and, for example, the conveying volume or capacity of the gear pump can be adjusted as a function of the gap width. This means that by influencing the hydraulic medium pressure acting on the pressure plate an exact conveyed flow regulation can be performed.

In U.S. Pat. No. 4,014,630 a pump arrangement is disclosed in which a sealing plate is forced by a spring into the contact position on the conveying elements. The spring chamber is connected by a throttle bore to the displacement chamber of the pump arrangement so that the pressure plate is also hydraulically prestressed into its sealing position. The pressure acting on the pressure plate can again be adjusted by a control device via which the hydraulic medium can be returned to a tank.

A disadvantage of this construction is that a considerable expenditure must be provided in order to be able to adjust the conveyed flow of the pump quickly to changes of the operating parameters of the motor.

SUMMARY OF THE INVENTION

It is an object of the present invention to provide a hydraulic medium supply for a CVT transmission which allows a fast adjustment of the conveyed flow to the changes of the operational and functional parameters of the motor of a vehicle.

In accordance with the present invention, this is achieved in that the control valve arrangement is electrically controlled.

According to the present invention, the control valve arrangement correlated with the pump is electrically controlled so that the conveyed flow change can be adjusted already beforehand, i.e., for example, upon initiation of the acceleration or braking process. This means that via suitable sensors changes of the corresponding control members (gas pedal, fuel pump, diesel pump, brake pedal etc.) are detected and, as a function of these changes, a signal is sent by the motor control to the control valve arrangement so that the fastest possible adjustment of the conveyed flow of the pump can be carried out.

The hydraulic medium supply arrangement according to the invention is preferably embodied such that the adjusting pump is a rotary piston pump (preferably an internal gear pump) in which the displacement chambers at their end faces are sealed by a pressure plate. This pressure plate is hydraulically pretensioned into its sealing position so that the sealing gap can be adjusted by changing the pressure acting on the backside of the pressure plate. When the sealing plate is in its lifted position, the pressure medium can flow directly from the high-pressure area of the pump into the low-pressure area of the pump so that the conveyed flow can be lowered. For changing the pressure acting on the pressure plate, three concepts are favored according to the present invention.

In the first variant, the adjustment of the conveyed flow is realized by a two edge flow control in which a pressure scale (pressure regulator) is loaded by the pressure downstream and upstream of a metering orifice and is electrically adjustable in order to connect a control connector, communicating with the backside of the pressure plate, to the return connector for the purpose of a control pressure reduction or to the pump for the purpose of an increase of the control pressure.

This pressure scale (pressure regulator) connects in one end position the pressure connector and the return connector to the tank so that the pressure plate is pressure-relieved and a fast adaptation to changes of the conveyed flow is possible.

The control arrangement can be designed especially compact when the metering orifice is a metering orifice bore provided in the piston of the pressure scale (pressure regulator). The piston furthermore has two control edges by which the connection of the control connector to the tank connector and to the pressure connector can be opened and closed. Such a configuration is disclosed in German patent application 199 17 593 published after the priority date of the instant application; its disclosure is incorporated into the instant application by reference.

Alternatively, the conveyed flow of the pump can also be realized by a single edge flow control or a single edge pressure control.

The latter is carried out, for example, by an electrically actuated pressure limitation valve by which the control pressure acting on the backside of the pressure plate is limited to a maximum pressure. This control pressure is taken from the high-pressure side of the pump by an inlet aperture and is supplied to the backside of the pressure plate.

In the single edge flow control a two port pressure scale (pressure regulator) is provided, which is loaded, on the one hand, by the pressure upstream of the measuring orifice arranged in the pressure line and, on the other hand, by the force of a solenoid and the pressure downstream of the measuring orifice wherein the two latter force components (solenoid and downstream pressure) act in the closing direction. Upon increase of the pressure differential across the measuring orifice, the pressure scale (pressure regulator) is moved into its through (open) position in which the control pressure is relieved in direction to the tank T so that the pressure plate is lifted off and moves into its open position.

DESCRIPTION OF THE PREFERRED EMBODIMENTS

Figure 1:
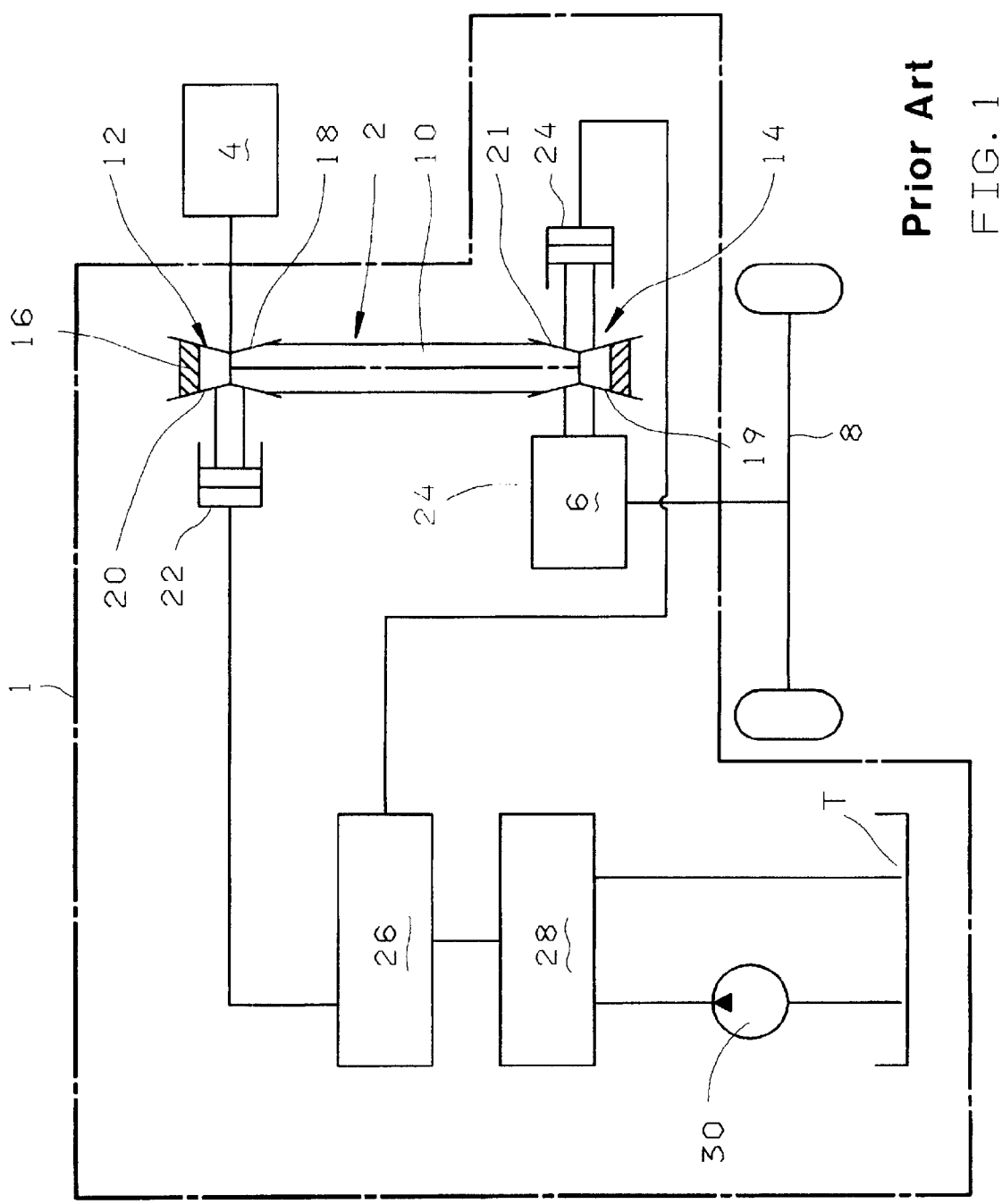
FIG. 1 is a representation of a basic CVT transmission of the prior art.

In the following discussion the components that have been described in connection with the prior art CVT transmission according to FIG. 1 are identified by the same reference numerals used supra.

Figure 2:
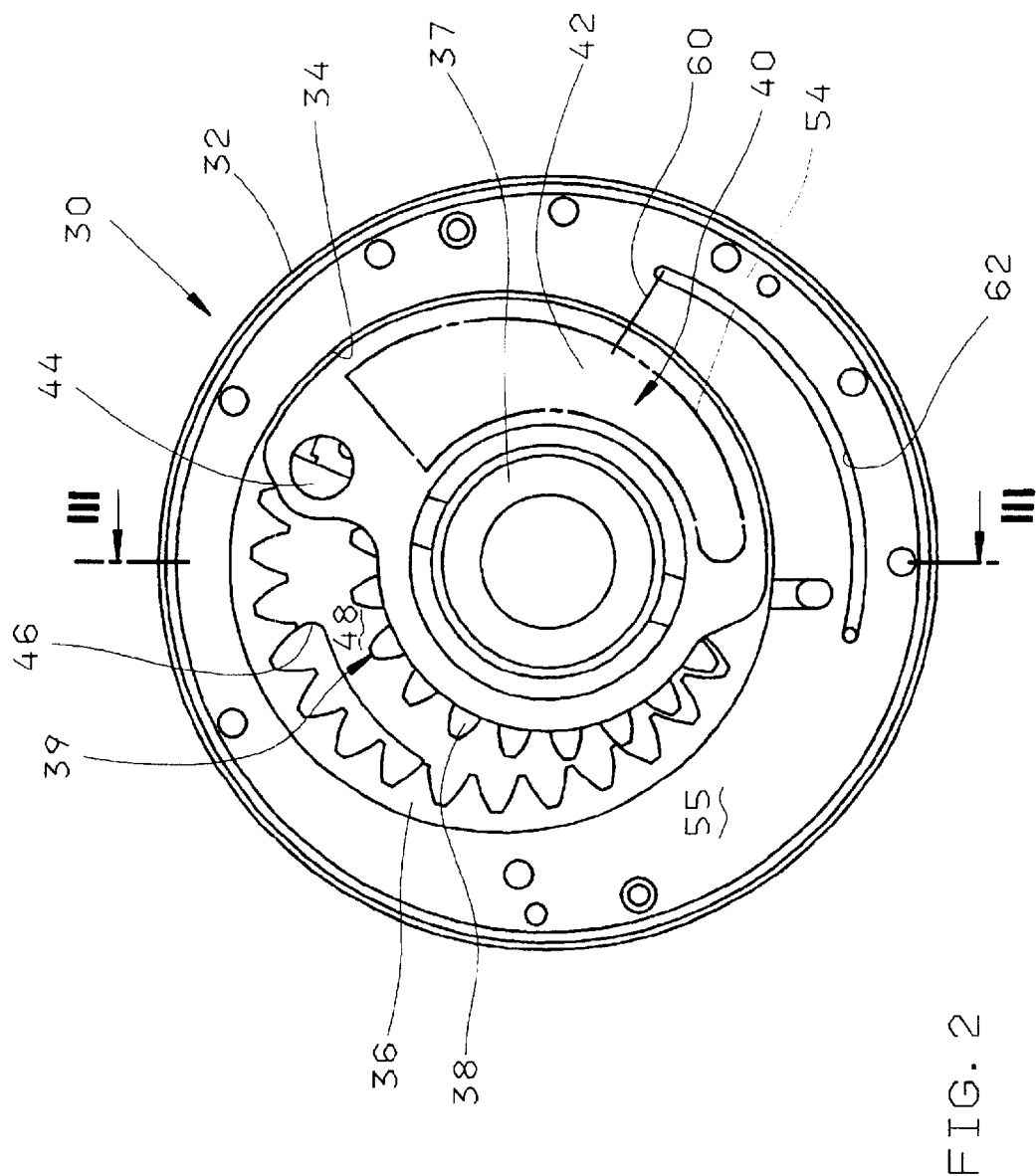
FIG. 2 is a section of an internal gear pump for use in a CVT transmission according to FIG. 1.
Figure 3:
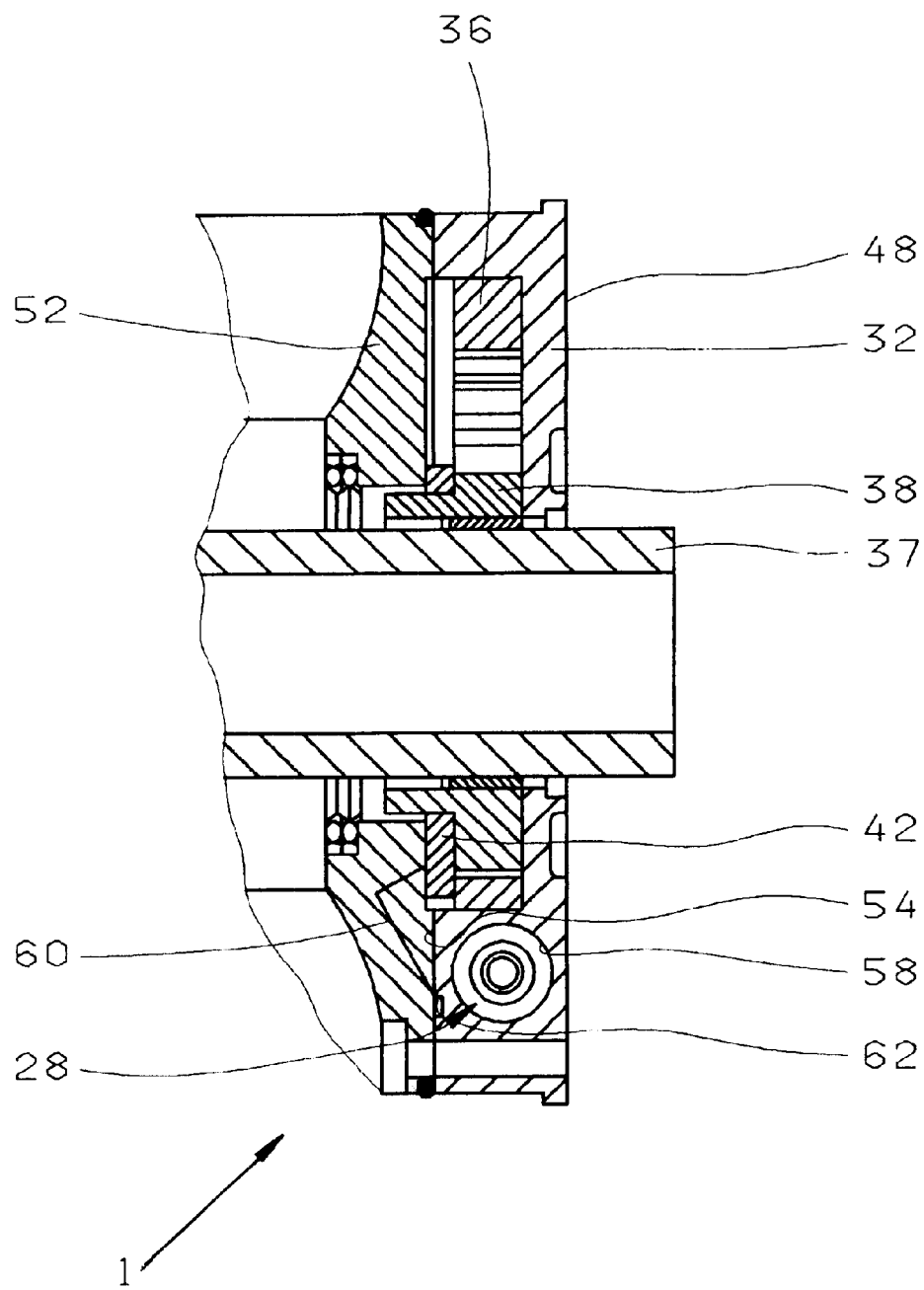
FIG. 3 is a section along the line III—III of FIG. 2.

FIG. 2 shows a plan view onto an internal gear pump 30 which can be used for a CVT transmission 1 for pumping and conveying the hydraulic medium. For reasons of simplification, in the representation according to FIG. 2 the housing cover has been omitted. FIG. 3 shows a section of the internal gear pump 30 along the section line III—III of FIG. 2.

The basic configuration of such an internal gear pump 30 is already known from the prior art, for example, from German patent document 43 22 240 C2 owned by the instant assignee, so that in the following only the important components will be discussed. The internal gear pump 1 has a cup-shaped housing 30 with an eccentrically arranged receptacle 34 for an internal gear wheel 36 which meshes with a pinion 38 driven by a drive shaft 37 penetrating the housing 30. The pinion 38 is driven by a follower (not shown) also supported on the shaft 37. Because of the eccentric arrangement of the internal gear wheel 36 relative to the pinion 38, the space defined by the receptacle 32 can be divided into a low pressure area 39 and a high pressure area 40.

The closure of the high pressure area 40 at the end faces is realized by a pressure plate 42. In this high pressure area 40 the teeth of the internal gear wheel 36 and of the pinion 38 mesh with one another so that between two teeth a respective displacement space is provided which is delimited at the end faces by the pressure plate 42 and the bottom of the receptacle 32.

In the transition area between the low pressure area 39 and the high pressure area 40 a filler member (not shown) is arranged that is supported by a filler pin 44 on the housing. The filler member rests with its lateral surfaces on the teeth of the pinion 38 and of the internal gear wheel 36 so that the pressure medium (hydraulic medium) in the gaps between the teeth can be guided along the filler member into the meshing tooth area (high pressure area 40). The supply of hydraulic medium into the low pressure area 39 is realized via the suction opening (intake opening) 46 in the end face 48 of the housing 30. The pressure-loaded hydraulic medium is removed through a pressure opening (not shown) in the end face 48. The suction (intake) opening 46 and the pressure (outlet) opening have a substantially kidney-shaped cross-section wherein the suction opening 46 is arranged radially farther outwardly than the pressure opening.

FIG. 3 shows a section along the section line III—III of FIG. 2. Accordingly, the closure of the internal gear pump 1 at the end faces is realized by a housing cover 52 which is screwed onto the flange surface 55 of the housing illustrated in FIG. 2. The housing cover 52 rests with a seal 54, indicated by a dashed line in FIG. 2, against the pressure plate 42. The seal 54 surrounds a pressure field which is loaded by high pressure in a manner to be disclosed in the following. By means of this pressure field the pressure plate 42, which is received axially with play between the housing cover 52 and the end faces of the internal gear wheel 36 and the pinion 38, is pretensioned into its contact (sealing) position against the end faces (see FIG. 3). In the opposite direction the pressure plate 42 is loaded by the pressure in the high-pressure area.

The pressure plate 42 can be moved in the axial direction so that the sealing gap between the end faces of the gear wheels 36, 38 and the contact surface of the sealing plate 42 can be adjusted. This means that upon increase of this sealing gap pressure medium can flow directly from the high-pressure area 40 into the low-pressure area 39 so that the volumetric efficiency of the internal gear pump 1 is reduced and the delivered volume flow is thus adjustable by variation of the sealing gap.

The contact pressure of the sealing plate 42 is adjusted by a control valve arrangement 28.

As can be seen in FIG. 3, this control valve arrangement 28 can be inserted, for example, into a substantially tangentially extending pressure channel 58 which is connected with a pressure connector (not shown) of the pump. By means of the control valve arrangement 28 a control pressure can be generated which is guided via the control channel 60 provided in the housing cover 52 to the backside of the pressure plate 42. The control channel 60 is connected also by a connecting channel 62 to the control connector of the control valve arrangement 28.

As already mentioned supra, in the afore describe configuration of the internal gear pump 30 the control valve arrangement 28 is integrated into the housing 32. Of course, the present invention can also be used in variants in which the control valve arrangement 28 is an attached part or a separate component.

In the following, three variants of a connection arrangement for controlling the internal gear pump 30 represented in FIGS. 2 and 3 are described.

Figure 4:
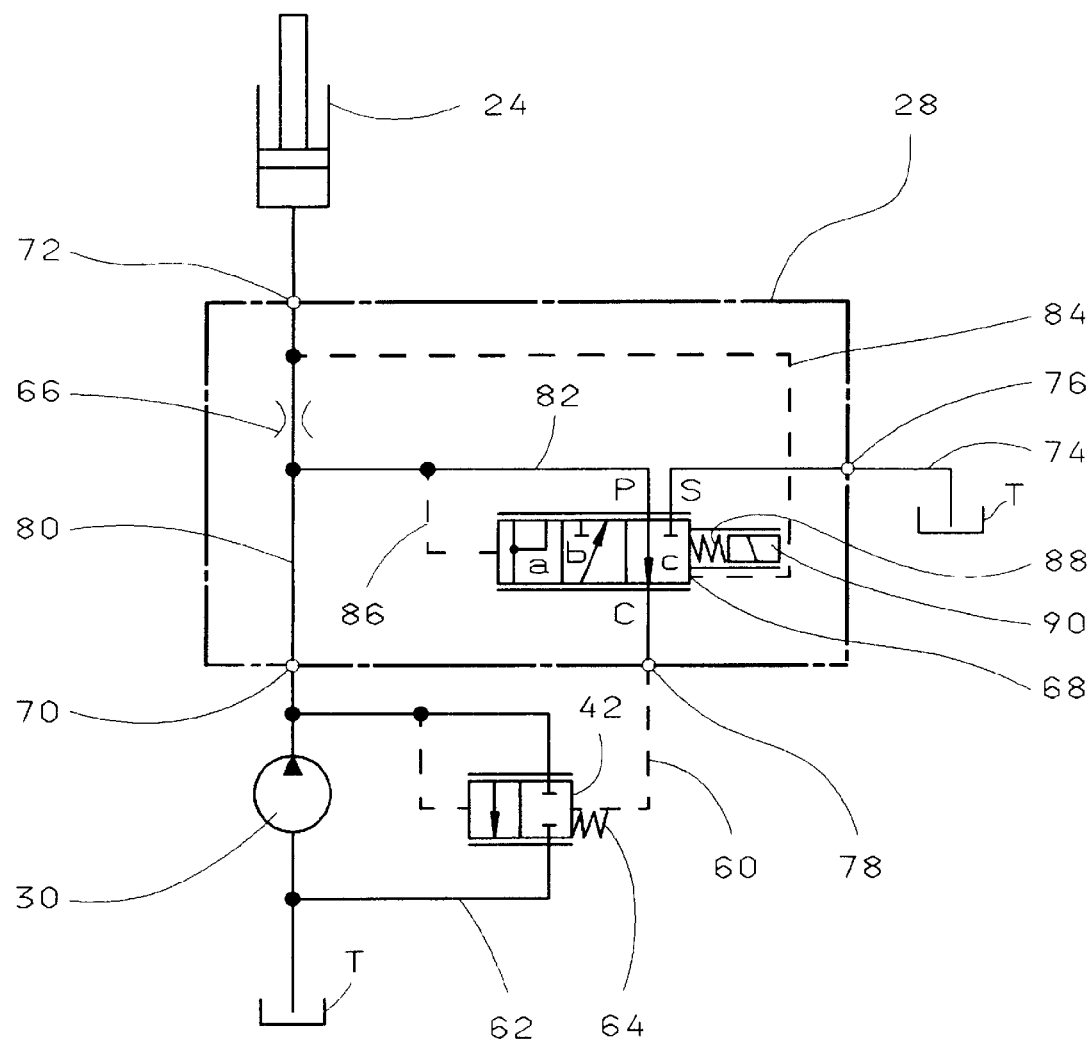
FIG. 4 is a connection schematic of a two-edge flow control for the internal gear pump of FIG. 2.
Figure 5:
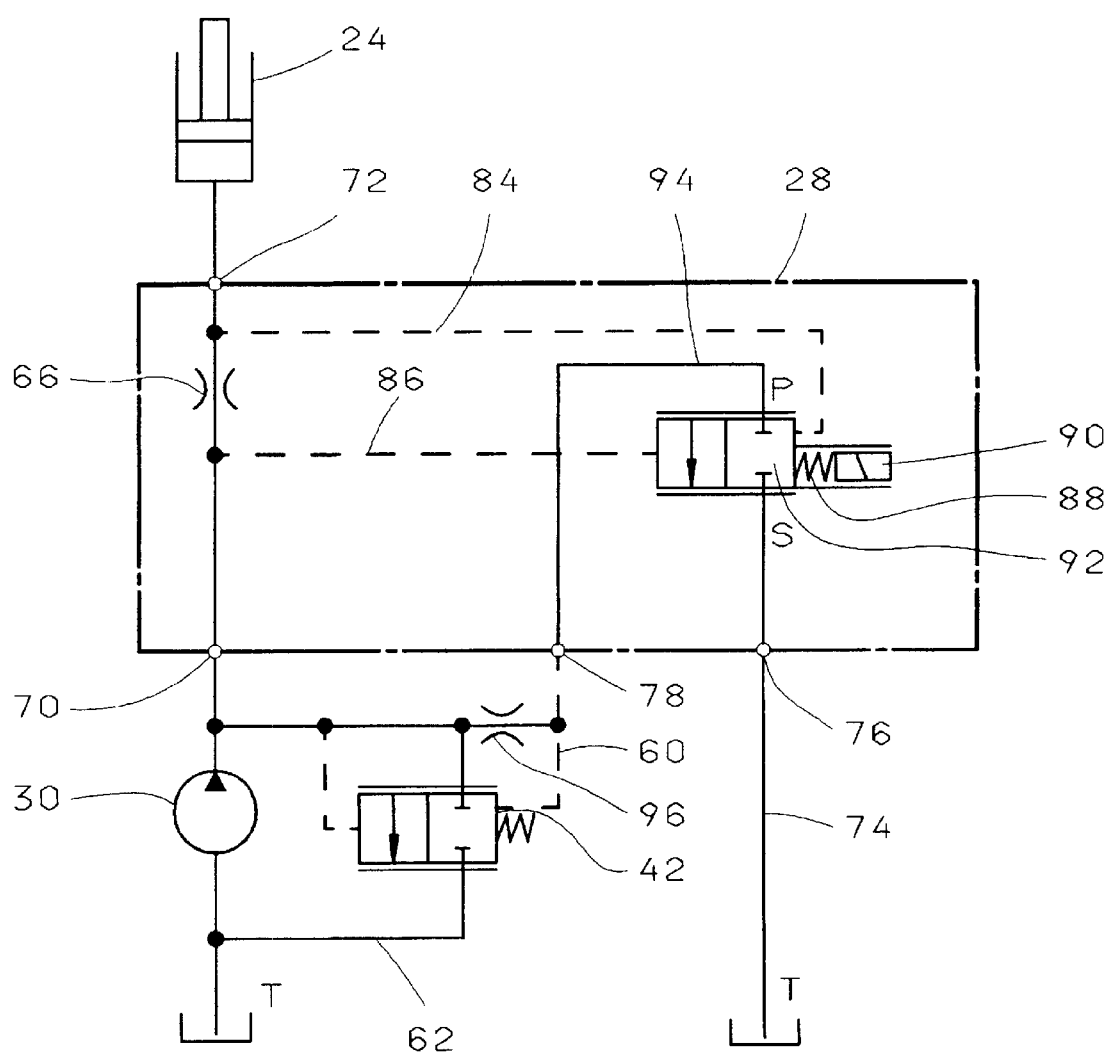
FIG. 5 is a connection schematic for a single-edge flow control for the internal gear pump of FIG. 2.
Figure 6:
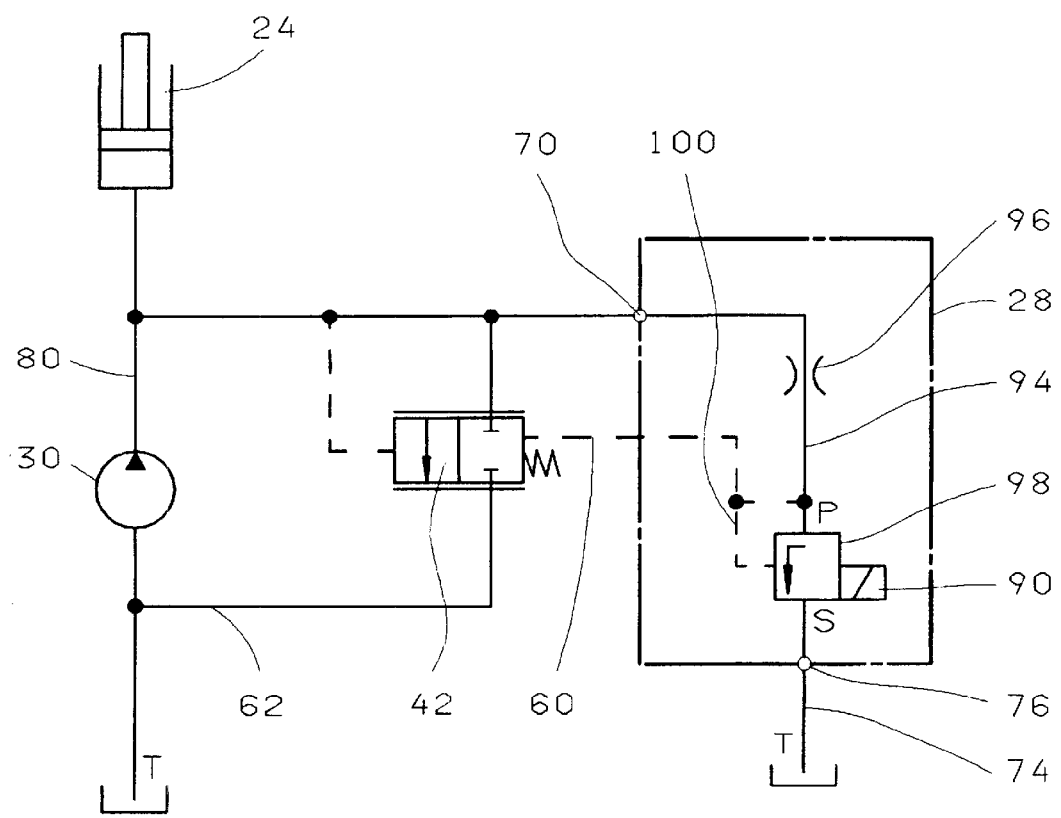
FIG. 6 is a connection schematic of a single-edge pressure control for the internal gear pump of FIG. 2.

In order to simplify the illustrations, in the FIGS. 4, 5, and 6 only one of the control cylinders 22 and 24 of FIG. 1 is shown. The control cylinder 24 symbolizes in the drawings FIGS. 4, 5, and 6 the control device 26 and the control cylinders 22, 24 as well as the belt drive 2 connected thereto.

The internal gear pump 30 illustrated in FIGS. 2 and 3 is represented in the following Figures by the pump symbol (reference numeral 30) and a bypass 62 which can be closed off by the pressure plate 42.

The pressure plate 42 in the illustrations to be discussed in the following is illustrated as a continuously adjustable two-port valve wherein the pressure plate 42 in the closed position closes the bypass 62 (pressure plate is in sealing contact) and upon reduction of the pressure in the pressure field 54 enlarges the sealing gap and thus is moved into an open position in which the hydraulic medium which is pressure-loaded by the high-pressure area 40 can flow via the bypass 62 into the low-pressure area 39.

The pressure plate 42 is, on the one hand, loaded by the pressure in the high-pressure area 40, i.e., the pressure in the displacement chambers, in the opening direction and, on the other hand, by the pressure in the control channel 60 and the force of the spring 64 into the closed (sealing) position.

The adjustment of the conveyed flow is realized by the control valve arrangement 28 which in the representation of FIG. 4 is indicated in dash-dot lines.

In the embodiment represented in FIG. 4 the control valve arrangement 28 has a metering orifice 66 and a continuously adjustable three-port pressure scale (pressure regulator) 68.

The control valve arrangement 28 has furthermore a pressure connector 70 connected to the internal gear pump 30, a work connector 72 connected to the control cylinders 22, 24, a return connector 76 connected to the tank T via a return channel 74, and a control connector 78 to which the control channel 60 is connected.

The metering orifice 66 is arranged in a pressure channel 80, wherein a line 82 branches off upstream of the metering orifice 66 to an inlet connector P of the pressure scale 68. The return channel 74 is connected with connector S and the control channel 60 is connected with connector C of the pressure scale 68.

The piston of the pressure scale 68 is loaded by a control line 84 with the pressure downstream of the metering orifice 66 and by a control line 86 with the pressure upstream of the metering orifice 66. In addition to the pressure in the control line 84 the piston of the pressure scale 68 is loaded in the basic position represented in FIG. 4 by the force of a spring 88 whose pretension (prestress) is changeable by a solenoid 90. The solenoid 90 is connected to the motor control or transmission control so that the spring pretension 88 can be controlled as a function of the operating and functional parameters of the motor of the motor vehicle.

In the represented basic position, the connector S is closed and the two connectors P and C of the pressure scale 68 are connected to one another so that the pressure upstream of the metering orifice 66 is guided via the line 82 and the control channel 60 to the backside of the pressure plate 42. When the conveyed flow volume increases, the piston of the pressure scale 68, because of the pressure drop across the metering orifice 66 and upon surpassing of a pressure differential determined by the pretension of the spring 88, is moved from the represented basic position (c). The piston of the pressure scale 68 is thus moved into a control position which is determined by the pressure differential across the metering orifice and the spring pretension. In this control position, the pressure on the pressure plate 42 is within its predetermined range; this range can be changed by triggering the solenoid 90. Upon surpassing a predetermined pressure, the connectors C and S are connected so that the pressure in the control channel 60 is relieved and the pressure plate 42 is lifted off into the open position, so that the sealing gap is enlarged and the hydraulic medium can flow from the high-pressure area into the low-pressure area. The volume flow conveyed by the internal gear pump 30 is reduced.

Because of the reduction of the volume flow the pressure decrease across the metering orifice 66 is also reduced so that via the pressure scale 68 the connection between the connectors P and C is again opened resulting in a pressure increase in the control channel 60 and a decrease of the sealing gap of the pressure plate 42. This means that, as a function of the pretension of the spring 88 adjusted by the solenoid 90, a volume flow, or more precisely, a pressure drop value across the metering orifice 66 can be determined at which the afore described control for limiting the volume flow will start.

The aforementioned older German patent application 199 17 593 discloses the configuration of the control valve arrangement 28 in which the metering orifice 66 and the pressure scale 68 are combined in a hydraulically controlled control valve. With respect to further details of the configuration of the control valve, reference is made to the disclosure of this older application.

The afore described embodiment is a so-called two-edge flow control in which the connector C (control connector) can be connected to the connector P (pressure connector) for increasing the pressure and can be connected to the connector S (return connector) for decreasing the pressure.

In the embodiment represented in FIG. 4 the pressure scale (pressure regulator) 68 is moreover provided with a position (a) in which the connector C as well as the connector P are connected to the connector S. This position (a) is reached when the initial pressure of the internal gear pump 30 is very high and/or the spring pretension of the spring 88 is adjusted to a very minimal value. In the position identified by (a) the pressure plate 42 is relieved so that a fast changing of the conveyed flow is possible.

In FIG. 5 a variant is represented in which the volume flow can be controlled by a single-edge control.

In this embodiment, an internal gear pump 30 is also used which has a conveyed flow that is changeable by changing the sealing gap of the pressure plate 42.

The control valve arrangement 28 indicated in FIG. 5, as in the previously disclosed embodiment, has a pressure connector 70, a work connector 72, a control connector 78, and a return connector 76. The control valve arrangement 28 furthermore comprises a metering orifice 66 and a two-port pressure scale (pressure regulator) 92. The end faces of the piston of the pressure scale 92, as in the previously disclosed embodiment, are loaded by control lines 84, 86 with the pressure upstream or downstream of the metering orifice 66, wherein the pressure downstream of the metering orifice acts in the closing direction of the pressure scale 92 and the pressure upstream of the measuring orifice 66 acts in the opening direction of the pressure scale 92. The piston of the pressure scale 92 is moreover pretensioned by a spring 88 in the closing position wherein the spring pretension can also be changed by a solenoid 90.

The inlet connector P of the pressure scale 92 is connected via channel 94 and an inlet aperture 96 with the line upstream of the metering orifice 66. In the connection schematic represented in FIG. 5 the channel 94 opens into the high-pressure area of the bypass 62.

In the area between the connector P and the inlet aperture 96 the control channel 60 branches off by which the backside of the pressure plate 42 can be loaded with control pressure.

In the basic position represented in FIG. 5, the piston of the pressure scale 92 is pretensioned by the pressure downstream of the metering orifice 66 and the force of the spring 88 into the closed position in which the connection between the connectors P and S is closed. The pressure upstream of the metering orifice 66 acts on the pressure plate 42 so that it is pretensioned into the sealing position. Upon increase of the flow volume, the pressure drop across the metering orifice 66 increases so that the piston of the pressure scale 92 can be moved as a function of the pretension of the spring 88 from the closed position into an open position in which the connector P is connected to the connector S so that the pressure medium or hydraulic medium can flow into the tank T. With this returning hydraulic medium a pressure drop across the inlet aperture 96 results so that the pressure plate 42 is relieved and the sealing gap is increased. The volume flow of the internal gear pump 30 is lowered so that the pressure scale 92 is returned into the represented basic position. This means that in the control position of the pressure scale 92 the pressure onto the pressure plate 42 is maintained in the optimal range which can be adjusted by the solenoid.

By adjusting the pretension of the spring 88 via the solenoid 90, it is thus again possible to control the volume flow which is to trigger the volume flow control of the internal gear pump 30.

FIG. 6 shows finally the last embodiment in which the volume flow control can be realized by a single-edge pressure control.

Similar to the afore described embodiments, the control cylinder 24 is supplied by the internal gear pump 30 with pressure medium from the tank T wherein the pressure plate 42 of the internal gear pump 30, as a function of the pressure acting on it, opens or closes the bypass 62 in order to allow or prevent internal return of pressure medium.

The control valve arrangement 28 in the embodiment represented in FIG. 6 has an electrically actuatable pressure limitation valve 98 whose outlet connector S is connected to the return channel 74 and whose inlet connector P is connected by channel 94 and inlet aperture 96 to the pressure channel 80, i.e., to be more precise, to the high-pressure branch of the bypass 62.

The backside of the pressure plate 42 is loaded by a control channel 60 with the pressure downstream of the inlet aperture 96. This pressure acts via control line 100 also in the opening direction on the pressure limitation valve 98.

By means of the pressure limitation valve 98 it is thus possible to limit the pressure in the control channel 60 to a limit value which can be adjusted by the solenoid 90. Upon surpassing this limit value, the pressure limitation valve 98 opens so that pressure medium can flow via the channel 94, the connectors P and S, and the return channel 74 to the tank T. This hydraulic medium flow results in a pressure drop across the inlet aperture 96 so that the pressure plate 42 is lifted off and the sealing gap is enlarged for internal return of the pressure medium into the internal gear pump 30. Upon lowering of the pressure below the pre-adjusted limit value, the pressure limitation valve 98 closes so that the pressure plate 42 is again forced into its sealing position. The conveyed flow increases again.

An important aspect of the afore described embodiments is that the pressure acting on the backside of the pressure plate 42 can be changed as a function of the operational parameters via the motor control or transmission control.

In the embodiments represented in FIGS. 4 and 5, the pretension of the spring 88 is adjusted by means of the solenoid 90. In principle, it is also possible to use a directly acting solenoid. Of course, it is also possible to employ pulling solenoids in a kinematic reversal of the shown arrangement.

Disclosed is a hydraulic medium supply arrangement for a CVT transmission in which the hydraulic medium or pressure medium is conveyed by a rotary piston pump, preferably an internal gear pump. For adjusting the conveyed flow, the pressure at the backside of a pressure plate sealing off the displacement chamber can be adjusted by an electrically adjustable control valve.

While specific embodiments of the invention have been shown and described in detail to illustrate the inventive principles, it will be understood that the invention may be embodied otherwise without departing from such principles.

What is claimed is:

1. A pressure medium supply arrangement for a CVT transmission, said arrangement comprising:

a pump (30) configured to supply pressure medium to control cylinders (22, 24) of the CVT transmission to change a gear ratio of the CVT transmission;

said pump (30) having a high pressure side and a low pressure side;

said pump further having a bypass channel (62) connecting said high pressure side and said low pressure side;

an electrically controlled control valve arrangement (28) connected to said pump (30) and configured to open and close said bypass channel (62) for adjusting a conveyed flow of said pump (30);

wherein said pump (30) is a rotary piston pump having a pump housing with displacement chambers, wherein said rotary piston has a pressure plate (42) closing off an end face of said displacement chambers, wherein said pressure plate (42) is configured to be movable between a sealing position and an open position, wherein said pressure plate (42) has a backside remote from said displacement chambers, wherein said control valve arrangement (28) is connected to said backside and supplies the pressure medium to said backside as a control pressure, wherein said control pressure controls said sealing position and said open position, and wherein said open position defines said bypass channel (62);

wherein said control valve arrangement (28) comprises a 3-port pressure regulator (68) having a valve housing with a pressure connector (P), a return connector (S), and a control connector (C) connected to said backside, wherein said pressure regulator (68) further comprises a piston movably guided in said valve housing, wherein said control valve arrangement (28) has a metering orifice (66), positioned between the control cylinder (24) and said pump (30), wherein said piston is loaded by a first force provided by the pressure upstream of said metering orifice (66) and by a second force provided by the pressure downstream of said metering orifice (66), wherein said control valve arrangement (28) further comprises a solenoid acting on said piston as a third force, wherein an increase of said third force moves said piston in a first direction in which said control pressure increases and a decrease of said third force moves said piston in a second direction in which said control pressure decreases.

2. The pressure medium supply arrangement according to claim 1, wherein said pressure regulator (68) has a position in which said pressure connector (P) and said control connector (C) are connected to said return connector (S).

3. The pressure medium supply arrangement according to claims 1, wherein said piston has a bore forming said metering orifice (66) and further has two control edges configured to connect said control connector (C) to said pressure connector (P) for increasing said control pressure and to connect said control connector (C) to said return connector (S) for decreasing said control pressure.

4. The pressure medium supply arrangement according to claim 1, wherein said pump (30) is an internal gear pump.

5. A pressure medium supply arrangement for a CVT transmission, said arrangement comprising:

a pump (30) configured to supply pressure medium to control cylinders (22, 24) of the CVT transmission to change a gear ratio of the CVT transmission;

said pump (30) having a high pressure side and a low pressure side;

said pump further having a bypass channel (62) connecting said high pressure side and said low pressure side;

an electrically controlled control valve arrangement (28) connected to said pump (30) and configured to open and close said bypass channel (62) for adjusting a conveyed flow of said pump (30);

wherein said pump (30) is a rotary piston pump having a pump housing with displacement chambers, wherein said rotary piston has a pressure plate (42) closing off an end face of said displacement chambers, wherein said pressure plate (42) is configured to be movable between a sealing position and an open position, wherein said pressure plate (42) has a backside remote from said displacement chambers, wherein said control valve arrangement (28) is connected to said backside and supplies the pressure medium to said backside as a control pressure, wherein said control pressure controls said sealing position and said open position, and wherein said open position defines said bypass channel (62);

wherein said control valve arrangement (28) comprises a channel (94) with inlet aperture (96) configured to branch off said control pressure at a location downstream of said pump (30), wherein said channel (94) has an electrically actuated pressure limitation valve (98) comprising a solenoid (90) and configured to limit said control pressure, wherein said pressure limitation valve (98) is loaded by a pressure upstream of said inlet aperture (96) in a direction of opening and by said solenoid (90) in a direction of closing.

6. The pressure medium supply arrangement according to claim 5, wherein said pump (30) is an internal gear pump.

7. A pressure medium supply arrangement for a CVT transmission, said arrangement comprising:

a pump (30) configured to supply pressure medium to control cylinders (22, 24) of the CVT transmission to change a gear ratio of the CVT transmission;

said pump (30) having a high pressure side and a low pressure side;

said pump further having a bypass channel (62) connecting said high pressure side and said low pressure side;

an electrically controlled control valve arrangement (28) connected to said pump (30) and configured to open and close said bypass channel (62) for adjusting a conveyed flow of said pump (30);

wherein said pump (30) is a rotary piston pump having a pump housing with displacement chambers, wherein said rotary piston has a pressure plate (42) closing off an end face of said displacement chambers, wherein said pressure plate (42) is configured to be movable between a sealing position and an open position, wherein said pressure plate (42) has a backside remote from said displacement chambers, wherein said control valve arrangement (28) is connected to said backside and supplies the pressure medium to said backside as a control pressure, wherein said control pressure controls said sealing position and said open position, and wherein said open position defines said bypass channel (62);

wherein said control valve arrangement (28) comprises a channel (94) with inlet aperture (96) configured to branch off said control pressure at a location downstream of said pump (30) and further comprises a return channel (74), wherein said control valve arrangement (28) has a pressure scale (92) comprising a piston movable between an open position to open a connection between said channel (94) with said inlet aperture (96) and said return channel (74) for decreasing said control pressure and a closed position in which said connection is closed, wherein said control valve arrangement (28) has a metering orifice (66), positioned between the control cylinder (24) and said pump (30), wherein said piston is loaded by a first force provided by the pressure upstream of said metering orifice (66) and by a second force provided by the pressure downstream of said metering orifice (66), wherein said control valve arrangement (28) further comprises a solenoid acting on said piston as a third force, wherein said first force moves said piston into said open position and wherein said second and third forces move said piston into said closed position.

8. The pressure medium supply arrangement according to claim 7, wherein said pressure scale is a two-port pressure scale (92).

9. The pressure medium supply arrangement according to claim 7, wherein said pump (30) is an internal gear pump.

* * * * *